(12) United States Patent
Chen et al.

(10) Patent No.: US 7,649,938 B2
(45) Date of Patent: Jan. 19, 2010

(54) METHOD AND APPARATUS OF CONTROLLING A PLURALITY OF VIDEO SURVEILLANCE CAMERAS

(75) Inventors: Wen-hsiung Chen, Sunnyvale, CA (US); Fang Wu, Pleasanton, CA (US); Philip R. Graham, Milpitas, CA (US); Gregory D. Pelton, Raleigh, NC (US); Blane A. Eisenberg, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 893 days.

(21) Appl. No.: 10/970,129

(22) Filed: Oct. 21, 2004

(65) Prior Publication Data
US 2006/0088092 A1 Apr. 27, 2006

(51) Int. Cl.
H04N 7/12 (2006.01)
H04N 7/18 (2006.01)
(52) U.S. Cl. .................. 375/240.01; 375/240; 348/143; 348/159
(58) Field of Classification Search ................. 375/240, 375/240.01, 240.12, 240.29; 348/143, 159, 348/211.3
See application file for complete search history.

(56) References Cited

U.S. PATENT DOCUMENTS

| | | | |
|---|---|---|---|
| 5,216,503 A | 6/1993 | Paik et al. ..................... | 358/133 |
| 5,862,140 A | 1/1999 | Shen et al. ................... | 370/468 |
| 5,877,812 A | 3/1999 | Krause et al. ................ | 348/385 |
| 5,956,088 A | 9/1999 | Shen et al. ................... | 348/385 |
| 6,192,083 B1 * | 2/2001 | Linzer et al. ............. | 375/240.29 |
| 6,477,280 B1 | 11/2002 | Malvar ........................ | 382/245 |
| 6,611,503 B1 | 8/2003 | Fitzgerald et al. ........... | 370/260 |
| 6,771,828 B1 | 8/2004 | Malvar ....................... | 382/240 |
| 2001/0055336 A1 | 12/2001 | Krause et al. .......... | 375/240.11 |

(Continued)

FOREIGN PATENT DOCUMENTS

WO   WO 97/39584   10/1997

(Continued)

OTHER PUBLICATIONS

"Express 6 Brochure." Downloaded Sep. 2004. *StarDot Technologies*, Buena Park, CA. Available online at ftp://www.stardot-tech.com/pub/express6/express6-brochure.pdf.

(Continued)

*Primary Examiner*—Allen Wong
(74) *Attorney, Agent, or Firm*—Dov Rosenfeld; Inventek

(57) ABSTRACT

An apparatus, a method, and a software product to control a plurality of surveillance video camera/encoder combinations. The method includes receiving a plurality of encoded video streams from a respective surveillance camera/encoder combination, and accepting a measure of the level of activity for each encoded video stream. Each measure is obtained from the output of the camera of the corresponding camera/encoder combination. The method further includes assigning output bit rates for each encoded stream according to the accepted level of activity such that a maximum overall bit rate is not exceeded. One version is for controlling camera/encoder combinations that accept remote bit rate control, and a second is for controlling camera/encoder combinations that send at a pre-set bit rate. One version includes a network connection between the camera/encoder combinations, and the method or apparatus for central control.

36 Claims, 9 Drawing Sheets

U.S. PATENT DOCUMENTS

| | | | | |
|---|---|---|---|---|
| 2002/0097322 | A1* | 7/2002 | Monroe et al. | 348/159 |
| 2004/0160960 | A1 | 8/2004 | Monta et al. | 370/395.4 |
| 2004/0160971 | A1 | 8/2004 | Krause et al. | 370/412 |
| 2004/0174434 | A1* | 9/2004 | Walker et al. | 348/211.3 |
| 2004/0228540 | A1 | 11/2004 | Chen et al. | 382/246 |

FOREIGN PATENT DOCUMENTS

| | | |
|---|---|---|
| WO | WO 03/090421 | 10/2003 |

OTHER PUBLICATIONS

"NetCam Brochure." Downloaded Sep. 2004. *StarDot Technologies*, Buena Park, CA. Available online ftp://www.stardot-tech.com/pub/netcam/netcam-brochure.pdf.

"V .Networks Website." Downloaded Sep. 2004. *Victor Company of Japan, Limited* (JVC) , Yokohama, Japan. Available online at http://www.jvc-victor.co.jp/english/pro/vnetworks/index-e.html.

Product Information: "VN-A1U: Network Encoder." Downloaded Sep. 2004. *Victor Company of Japan, Limited* (JVC), Yokohama, Japan. Available online at http:/ /www.jvc-victor.co.jp/english/pro/vnetworks/products/vn-a1u.html.

Product Information: "VN-C10U: Visual Network System." Downloaded Sep. 2004. *Victor Company of Japan, Limited* (JVC), Yokohama, Japan. Available online at http:/ /www.jvc-victor.co.jp/english/pro/vnetworks/products/vn-c10u.html.

Product Information: "VN-C30U: Visual Network System." Downloaded Sep. 2004. *Victor Company of Japan, Limited* (JVC), Yokohama, Japan. Available online at http:/ /www.jvc-victor.co.jp/english/pro/vnetworks/products/vn-c30u.html.

Product Information: "VN-S400U: Multi-Camera Browser Software." Downloaded Sep. 2004. *Victor Company of Japan, Limited* (JVC), Yokohama, Japan. Available online at http:/ /www.jvc-victor.co.jp/english/pro/vnetworks/products/vn-s400u.html.

"Reflex & Data Reflex: Statistical Multiplexing." Downloaded May 2004. *Tandberg Television Ltd*, Southampton, United Kingdom. Available online at http://www.tandbergtv.com/public/site/Primary/productdocs35/Reflex_v10.pdf.

"Surveillance IP Cameras: DM642 IP Camera." Downloaded Sep. 2004. *Texas Instruments Incorporated*, Dallas, Texas. Available online at http://focus.ti.com/docs/apps/catalog/general/applications.jhtml?templateId=5 450&path=templatedata/cm/general/data/vidimg_surveillance_dm642_ip_camera.

"Surveillance IP Cameras: Overview." Downloaded Sep. 2004. *Texas Instruments Incorporated*, Dallas, Texas. Available online at http:/ / focus . ti . com/vf /docs/appsoverview.tsp?templateId=5450 &path=templatedata/ cm/overview/data/ vidimg_surveillance_ovw.

"VideoONE Sentry Four." Downloaded Sep. 2004. *Array Microsystems, Inc.*, Colorado Springs, Colorado. Available online at http:/ /www.array.com/sentryfour.htm.

"VideoONE Sentry Four Brochure." Downloaded Sep. 2004. *Array Microsystems, Inc.*, Colorado Springs, Colorado. Available online at http:/ /www.array.com/sentry4-16.pdf.

"Axis IP-Surveillance Brochure." Downloaded Sep. 2004. *Axis Communications AB*, Lund, Sweden. Available online at http:/ /www.axis.com/documentation/brochure/camera/ip-surv.pdf.

* cited by examiner

METHOD AND APPARATUS OF CONTROLLING A PLURALITY OF VIDEO SURVEILLANCE CAMERAS

BACKGROUND

The present invention is related to video surveillance, and in particular to a method and apparatus of controlling a plurality of video cameras to provide sufficient video quality on an as needed basis while maintaining relatively low bandwidth and storage requirement.

Video surveillance systems using Closed Circuit Television (CCTV) are commonly installed in office buildings, external structures, schools, and even on city streets. Video surveillance is becoming an integral component of access control methods augmented with biometrics, security tracking systems and access tracking systems.

Historically, CCTV systems were designed for point-to-point transmission of video from a camera to a recorder, and required a separate infrastructure that employed coaxial cable with analog video signals.

Recent developments include digital surveillance video and data networks. With digital surveillance video, the video from a surveillance camera is provided in digital form, e.g., in compressed form. With such developments, video surveillance systems can now operate over more flexible wiring such as local area networks (LANs), e.g., twisted pair LANs, and fiber optic cables using protocols including TCP/IP, UDP, and RTP. The surveillance video streams are encoded and then stored in a digital format on a server or other computer hard drive as opposed to videotape such as analog videotape. This new breed of digital video surveillance systems allow IP (Internet Protocol) transmission of the video signals as a video stream, or as a combined voice/video stream that can be viewed remotely in real time, or stored for later review.

Video compression provides for efficiently transmitting and storing the video from a set of surveillance cameras. Video compression can either be carried out locally close to the video camera or can be carried out at a central location where the compressed video is stored. Known video compression formats that are used in modern digital video surveillance systems include: MPEG-1, MPEG-2, MPEG-4, H.261, H.263, and motion JPEG (MJPEG).

So-called digital surveillance cameras compress the video stream locally close-to or in the camera. Such a camera and encoder is called a surveillance camera/encoder combination herein. Thus, in one typical modern digital video surveillance system in which compression is carried out locally in a surveillance camera/encoder combination, the video captured from each surveillance camera in a surveillance camera/encoder combination is digitized and locally encoded by an encoder in the surveillance camera/encoder combination into a compressed video stream that has a constant bit rate. Each compressed video stream from a plurality of such surveillance camera/encoder combinations is sent to a central location for monitoring and storage. In such a system, each surveillance camera/encoder combination's encoder encodes the captured video independently at a pre-determined, e.g., constant bit rate if some of the cameras are in the same general region. The overall bandwidth (total bit rate that can be accommodated) for the plurality of surveillance camera/encoder combinations determines the pre-defined bit rate of each surveillance camera/encoder combination such that all surveillance camera/encoder combinations may be accommodated in the allocated bandwidth. In such a system, for any viewed location that is relatively quiet, e.g., where there is little or no activity, the surveillance camera/encoder combination's encoder provides the pre-defined bit rate by carrying out bit-stuffing. If there is little or no activity in all the cameras, each surveillance camera/encoder combination's encoder performs the bit-stuffing. On the other hand, if there is simultaneously a high level of activity in all or most of the surveillance camera/encoder combinations, the constant predetermined bit rate may not be sufficient to provide adequate video quality at least from some of the surveillance camera/encoder combinations. That is, in order not to waste too much bandwidth during such time—typically most of the time—when there is relatively little or no activity, a compromise is typically made in determining the pre-defined bit rate such that the bit rate is too low to provide adequate video quality on some scenes when there is activity. On the other hand, if the constant bit rate is set so that adequate quality is provided, there typically is a waste of bandwidth for those times—typically most of the time—when there is no activity.

Thus there is a need in the art for a method and apparatus of controlling a plurality of surveillance camera/encoder combinations that each provide a constant bit rate, the controlling configured to provide adequate view quality at critical times to not be wasteful of bandwidth at other times.

One prior art method is to control the bit rates of the surveillance camera/encoder combinations based on operator desire or other metrics as decided by the user of the equipment. One version includes the time of day as a metric, such that for a particular camera/encoder combination, the bit rate of the compressed video from the particular camera/encoder combination is relatively low at times of the day where there is less likely to be activity and higher for another time of day when there is a higher likelihood of activity in the scene viewed by the camera/encoder combination. Another version includes the amount of light, such that for a particular surveillance camera/encoder combination, the bit rate of the compressed video from the particular surveillance camera/encoder combination is relatively low when the lighting is relatively good.

SUMMARY

Described herein are an apparatus, a method, and a software product to control a plurality of surveillance video camera/encoder combinations. The method includes receiving a plurality of encoded video streams from respective surveillance camera/encoder combinations, and accepting a measure of the level of activity for each encoded video stream. Each measure is obtained from the output of the camera of the corresponding camera/encoder combination. The method further includes assigning output bit rates for each encoded stream according to the accepted level of activity such that a maximum overall bit rate is not exceeded.

In some embodiments, at least some of the camera/encoder combinations accept a remotely generated bit rate control to set the output bit rate of the encoded stream from the camera/encoder combination. For such versions, the method includes sending the assigned bit rates as respective bit rate controls to each of the camera/encoder combinations that accept a remotely generated bit rate control.

In some embodiments, at least some of the camera/encoder combinations output their respective encoded video stream at a respective pre-set bit rate. In such embodiments, camera/encoder combinations, for example, may not have the capability of accepting a remotely generated bit rate control to set the output bit rate of the encoded stream from the camera/encoder combination. For such embodiment, the method further includes transcoding the encoded video streams from the at least some of the camera/encoder combinations from the respective pre-set bit rate to the assigned bit rates.

The overall level of activity in some versions is determined at the camera/encoder combinations, and in other versions at the central control.

In some embodiments, the receiving from the camera/encoder combinations is over a packet network. Similarly, in those embodiments that include remote control of the output bit rate at the camera/encoder combination, the sending of the assigned bit rates is over a network. In other embodiment, some of the camera/encoder combinations are directly connected.

Other aspects and features of the invention will be clear from the drawings, detailed description, and claims.

BRIEF DESCRIPTION OF THE DRAWINGS

FIG. 2A shows a simplified block diagram of a camera/encoder combination whose encoder includes determining an overall measure of activity, and FIG. 2B shows a simplified block diagram of a camera/encoder combination whose encoder provides encoded output, such that the overall measure of activity is determinable from the encoded output. In each of FIG. 2A and FIG. 2B, the output bit rate is settable from an external source through a network connection.

DETAILED DESCRIPTION

One aspect of the invention uses a controller to control the bit-rate of each surveillance camera/encoder combination of a plurality of surveillance camera/encoder combinations based on the level of activity viewed by each surveillance camera/encoder combination.

Figure 1:
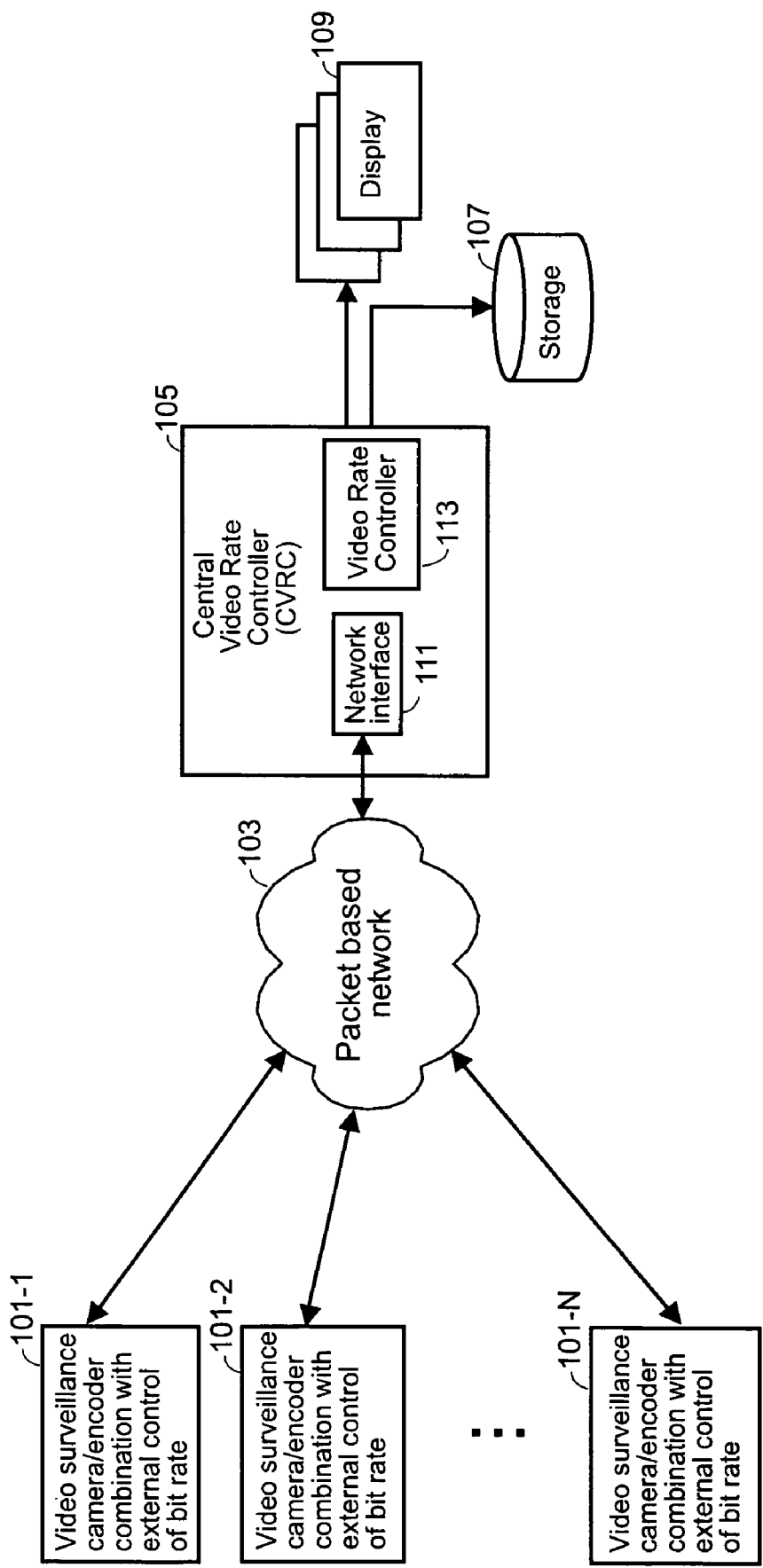
FIG. 1 shows a first exemplary surveillance camera control architecture that incorporates aspects of the invention, and that includes a plurality of camera/encoder combinations that each has remotely settable output bit rates.

FIG. 1 shows a first embodiment incorporating aspects of the invention. FIG. 1 shows a plurality, say a number denoted N, of video surveillance camera/encoder combinations 101-1, 101-2, . . . , 101-N, each at its respective location. Each surveillance camera/encoder combination's encoder encodes the video from the camera to provide a compressed stream at a constant bit rate (CBR). Each camera/encoder's CBR is settable from an external signal. The cameras are connected to a central video rate controller (CVRC) 105 via at least one receiver at the CVRC 105. In one embodiment shown in FIG. 1, the connection for at least some of the camera/encoders is a network connection via a network 103, e.g., a LAN, and each camera/encoder's CBR is settable via the network. In such an embodiment, the CVRC 105 includes a network interface 111. The CVRC also includes a video rate controller 113. In an alternate embodiment, the connections between at least some of the camera/encoder combinations and the CVRC are direct connections, and for such camera/encoders, the CVRC includes a receiver to receive the encoded video and a transmitter to transmit control to set the CBR such that the respective CBR for such a camera/encoder combination is settable via the direct connection.

In one embodiment, the CVRC 105 is configured to extract a respective measure of the activity level in each of the video streams from each camera/encoder combination's encoded stream. In another embodiment, each encoder in each camera/encoder combination extracts the respective measure of the activity level for the camera, and transmits the activity level to the CVRC 105, such that the CVRC 105 receives a respective measure of the activity level in each of the video streams from each camera/encoder combination. The video rate controller, e.g., video rate controller 113 in the CVRC 105 is further configured to assign the respective bit-rates to the encoder in each camera/encoder combination according to the respective extracted activity measure.

A storage medium 107 is included and configured to store the collected video streams, and a display subsystem 109 is included and arranged to display the plurality or a selected one or more of the plurality of video streams. The storage medium 107 and display subsystem 109 are coupled to the CVRC 105. In one embodiment, the coupling is a direct coupling, and in another, one or both of the storage medium 107 and display subsystem 109 are remote. In such an embodiment, the connection to element 107 or element 109 or both can be a network connection.

Figure 2A:
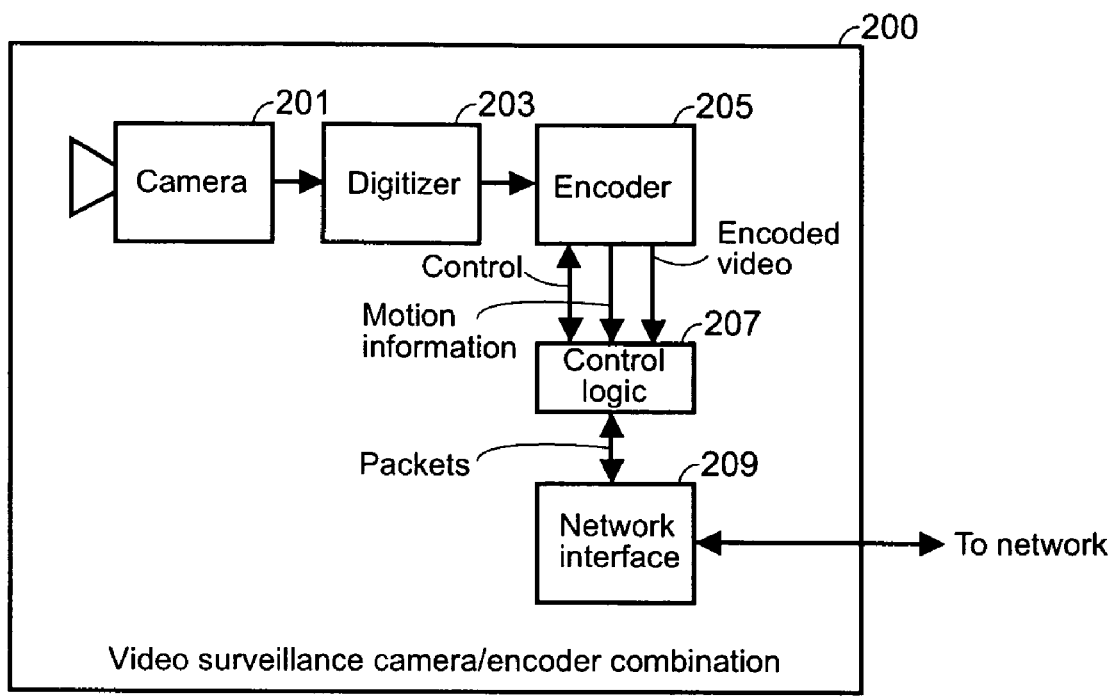
FIGS. 2A and 2B show two embodiments of a surveillance camera/encoder combination that can be used in embodiments of the invention.

One embodiment 200 of a video surveillance camera/encoder combination is shown in FIG. 2A. The camera encoder combinations 101-1, . . . , 101-N of FIG. 1 could each conform to such an embodiment 200. The camera/encoder combination 200 includes a video camera 201, a digitizer 203 to receive the video information, and an encoder 205 to encode the video at a constant bit rate. The constant bit rate is set by a control input to the encoder 205. A control logic subsystem 207 provides the constant bit rate to the encoder 205.

In one embodiment, the encoder further includes a motion estimator, also called a motion detector, that determines and provides a measure of the overall activity, e.g., overall motion in the current video frame to the control logic subsystem 207.

In a particular embodiment motion compensated interframe coding is used in the compression. In such an embodiment, each digitized video frame is divided into small blocks e.g., 8 by 8 blocks, and motion estimation is used to determine a motion vector from frame to frame for each block. The blocks are encoded, e.g., using transform encoding. For such an encoder, in one embodiment, the measure of the overall activity in a frame is determined by forming the sum of the magnitudes of the motion vectors. The measure is the sum expressed as a pre-determined number of bits, e.g., 8 bits. For such an embodiment, the measure of the overall activity in a frame is proportional to the sum of the motion vectors of the blocks as determined by motion estimation. Encoding methods that include such motion estimation and motion vectors include: MPEG-1, MPEG-2, MPEG-4, H.261 and H.263. In one embodiment, the encoder includes a buffer/bit stuffer to convert a variable bit rate stream to a constant bit rate stream.

Motion JPEG compression methods are known in which each frame is sent as a JPEG-encoded still frame independent of any other frame. The overall bit rate is determined by the frame rate,. e.g., the number of frames per second, and the compression of each frame. The compression of each frame is determined by the resolution. So more compression is achieved by reducing the resolution, e.g., from VGA resolution (640 by 480) to CIF frame resolution (320 by 240). JPEG compression includes dividing the image into small blocks, e.g., 8 by 8, determining the discrete cosine transform (DCT) of each block, quantizing the DCT coefficients, variable length coding the quantized coefficients, and, for the constant bit rate case, buffering and if necessary bit stuffing the encoded data at the constant desired bit rate.

In another embodiment in which motion JPEG is used, e.g., the encoder individually encodes each digitized frame into a JPEG encoded image at a desired resolution, and a desired quality level, e.g., quantization method, one embodiment of the encoder includes a motion detector that determines the measure of overall activity in a frame by performing block-by-block motion estimation compared to the previous block to form a set of motion vectors. However, unlike the case for motion compensated interframe encoding methods such as MPEG-1, MPEG-2, MPEG-4, H.261, or H.263, the determined motion vectors are used only to determine the measure of overall activity in a frame, and not to motion compensate blocks of data prior to encoding. In the motion JPEG encoder, the control input determines the output bit rate by controlling at least one of the following: the frame rate, the resolution of each frame, and the quantization used to quantize transform coefficients for each block in a frame.

Continuing with FIG. 2A, the control logic subsystem 207 accepts the encoded video and the measure of overall activity, and forms packets for a network interface 209 to send a central location, e.g., the CVRC 105 of FIG. 1. The network interface further is configured to send the measure of overall activity for each frame to another location, e.g., the CVRC 105 of FIG. 1. The network interface 209 further is configured to receive packets that contain instructions ("control messages") for setting the bit rate from the camera/encoder combination 200.

Figure 2B:
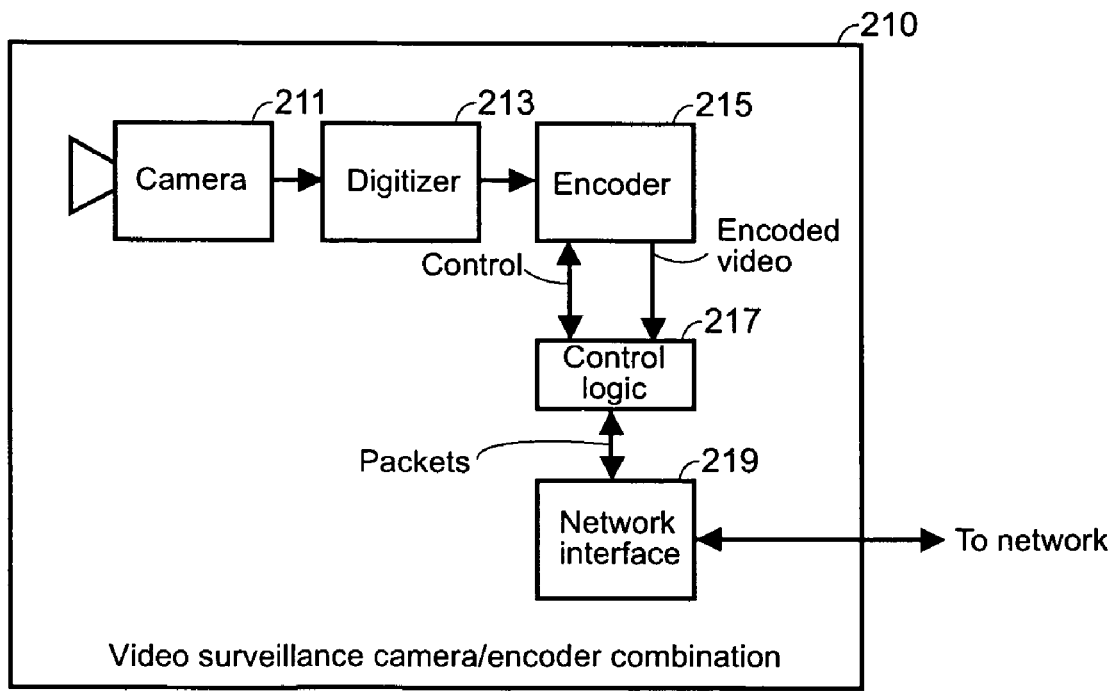

FIG. 2B shows an alternate embodiment 210 of a video surveillance camera/encoder combination that does not include the sending of a measure of overall activity. A camera 211, that could be the same as the camera 201, is coupled to a digitizer 213, that could be the same as the digitizer 203. The digitizer is coupled to an encoder 215 that encodes the video to a constant bit rate stream according to a control input. The encoded video is accepted by a control logic subsystem 217 that forms data for packets for transmission via a network interface 219 coupled to a packet network. The control logic subsystem is configured to accept control information via the network interface 219 to set the constant bit rate from the encoder.

Referring again to FIG. 1, when used with camera/encoder combinations such as shown in FIG. 2A, the CVRC 105 accepts the overall measure of the motion in a frame for each such camera/encoder combination, while when used with camera/encoder combinations such as shown in FIG. 2B, the CVRC 105 determines an overall measure of the motion in a frame from the encoded video itself. In either case, the video information is transported using the RTP protocol. In alternate embodiments, other protocols suitable for real time data are used, e.g., those that encrypt the information. In one embodiment, the control messages are included in special MAC frames designed for this purpose. In another embodiment a separate control link using UDP or TCP is used for transporting instructions from the CVRC 105 to the camera/encoder combinations.

Figure 3A:
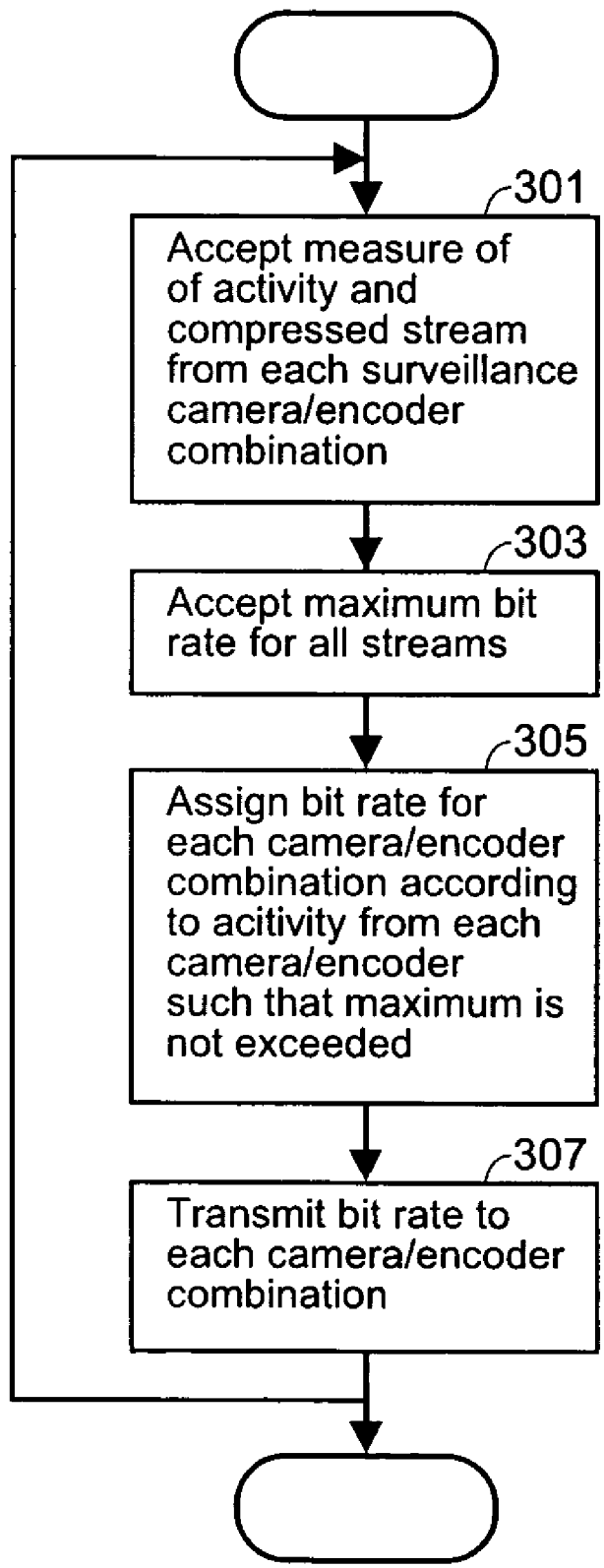
FIG. 3A shows a flowchart of one embodiment of controlling the bit rate of camera/encoder combinations applicable to an architecture such as shown in FIG. 1 for the case that each camera/encoder combination sends video information and further determines and sends separate activity level signals for each frame.

Thus, for a configuration in which each surveillance camera/encoder combination includes an encoder, i.e., a video compressor whose output bit-rate can be accessed and controlled by an external device, FIG. 3A shows a flowchart of one embodiment applicable to an architecture such as shown in FIG. 1 for the case that each camera/encoder combination sends video information and further determines and sends separate activity level signals for each frame. This flowchart is applicable, for example, for use with a surveillance camera/encoder combination such as shown in FIG. 2A.

Referring to FIG. 3A, in 301, the CVRC 105 accepts the encoded compressed stream from each camera/encoder combination and also the overall level of activity in each compressed stream from each camera/encoder combination. In one embodiment, the video compressor in each camera/encoder combination samples the video frames captured by the surveillance video camera. The compressor in each camera/encoder measures the activity and provides an overall level of activity. One embodiment includes a manual override, e.g., via operator input or via an alarm.

Alternate methods of determining the overall measure of activity in the video include: measuring the frame-to-frame RMS difference; measuring the sum of the motion vectors in the case that motion estimation or motion detection is included; or measuring the frame-to-frame change in background in a foreground/background method such as MPEG-4.

In one embodiment, the overall maximum total bit rate available for all information is provided, e.g., according to a pre-defined or operator defined bandwidth. Such overall bandwidth may be set, for example, by the capacity of recording apparatus such as storage 107 coupled to the CVRC 105, or the capacity of the network.

Thus, a maximum total bit rate for all video streams is provided and in 303 accepted by the CVRC. In 305, the CVRC 105 determines the bit rates for each surveillance camera/encoder combination under the CVRC's control according to the total available bandwidth. The bit rate for each respective surveillance camera/encoder combination is set according to the activity level of the encoded video from the camera/encoder, such that the maximum bandwidth is not exceeded. In one embodiment, the bit rate for each camera/ encoder combination is proportional to the determined activity level with the constraint of a minimum bit rate for each camera needed for overhead information and a maximum level equal to the maximum capability of the camera/encoder combination or a pre-set maximum.

In 307 the respective bit rate information is sent to the camera/encoder, e.g., via the network. The process continues, in one embodiment at a set rate, and in another embodiment, only if the activity levels have changed, e.g., such that 301 includes determining if any of the activity levels have changed.

Figure 3B:
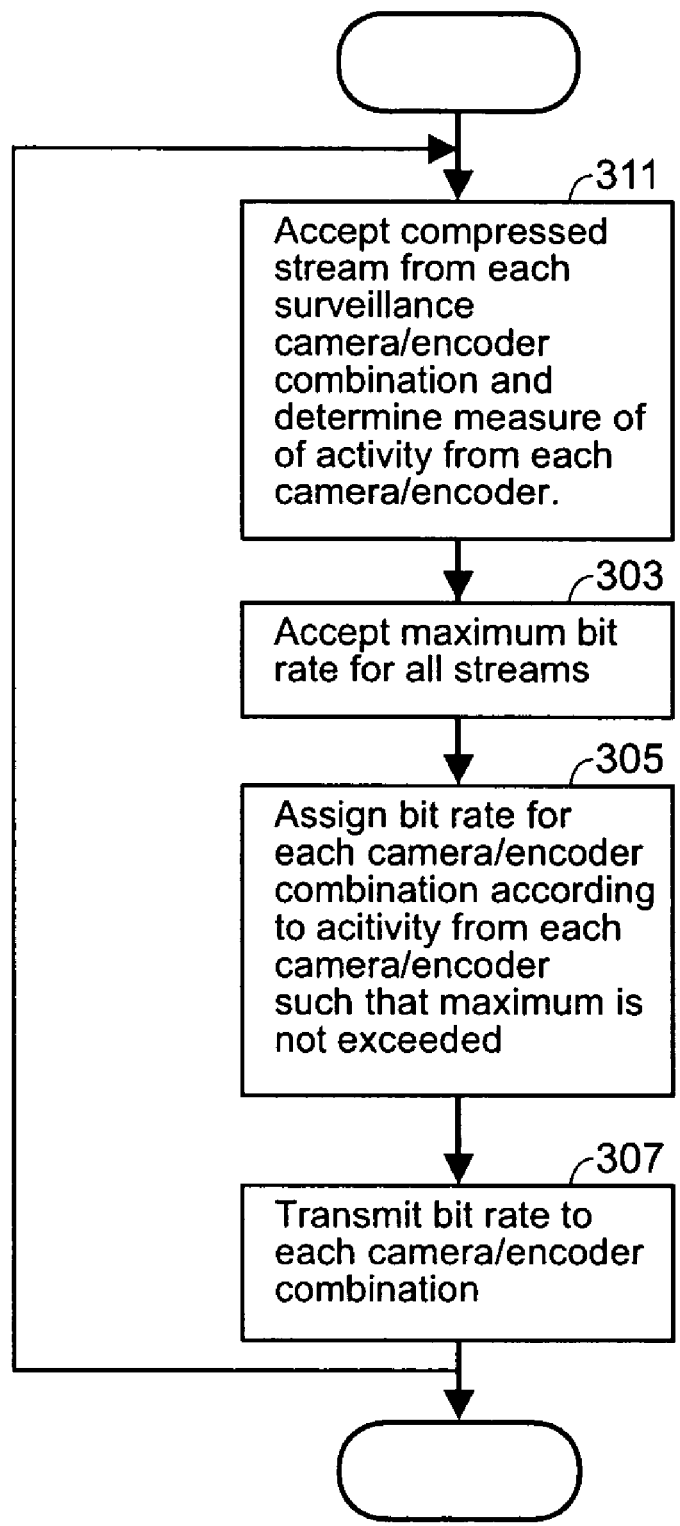
FIG. 3B shows a flowchart of another embodiment applicable to an architecture such as shown in FIG. 1 for the case that each camera/encoder combination sends encoded video information, and wherein any determination of the activity level signal for each frame is carried out remotely from the compressed video stream itself.

FIG. 3B shows a flowchart of another embodiment applicable to an architecture such as shown in FIG. 1 for the case that each camera/encoder combination sends encoded video information, and wherein any determination of the activity level signal for each frame is carried out remotely from the compressed video stream itself. This flowchart is applicable, for example, for use with a surveillance camera/encoder combination such as shown in FIG. 2B.

Referring to FIG. 3B, in 311, the CVRC 105 accepts the encoded compressed stream from each camera/encoder combination, and partially decodes the stream to determine for each video frames captured by the surveillance video camera a measure of the overall level of activity.

Alternate methods of determining the overall measure of activity in the video include: measuring the frame-to-frame RMS difference; measuring the sum of the motion vectors in the case that motion estimation or motion detection is included, or measuring the frame-to-frame change in background in a foreground/background method such as MPEG-4. Those skilled in the art will understand that not all motion detection/activity measurement methods are applicable to all embodiments.

In one embodiment, the overall maximum total bit rate available for all information is provided, e.g., according to a pre-defined or operator defined bandwidth. Such overall bandwidth may be set, for example, by the capacity of recording apparatus such as storage 107 coupled to the CVRC 105, or the capacity of the network.

As in FIG. 3A, a maximum total bit rate for all video streams is provided and in 303 accepted by the CVRC. In 305, the CVRC 105 determines the bit rates for each surveillance camera/encoder combination under the CVRC's control according to the total available bandwidth. The bit rate for each respective surveillance camera/encoder combination is set according to the activity level of the encoded video from the camera/encoder, such that the maximum bandwidth is not exceeded. In one embodiment, the bit rate for each camera/encoder combination is proportional to the determined activity level with the constraint of a minimum bit rate for each camera needed for overhead information and a maximum level equal to the maximum capability of the camera/encoder combination or a pre-set maximum.

Not shown in the flowcharts of FIGS. 3A or 3B are the decompression of the streams followed by displaying the streams. In alternate embodiments, the streams, e.g., in compressed form, are also archived for later review in a storage medium, e.g., a hard disk or DVD, digital video recorder, or other form. In alternate embodiments, the display may also be remote from the location of the CVRC, so that the video streams, again in compressed form are sent to a remote location for display and further storage.

At the surveillance video camera/encoder combinations, each surveillance video camera/encoder receives instruction from the CVRC 105 regarding the rate to encode the video. For example, in the embodiment shown in FIGS. 2A and 2B, the control signals are received from the network via the network interface 209, 219, respectively, and the control logic subsystem 207 and 217, respectively, determines a control signal for the encoder, 205, 215, respectively to encode the video information at the requested bit rate.

It may be that the surveillance video camera/encoder combination is not capable of having the bit rate controlled or otherwise set by an external device such as a CVRC 105 of FIG. 1.

Figure 4:
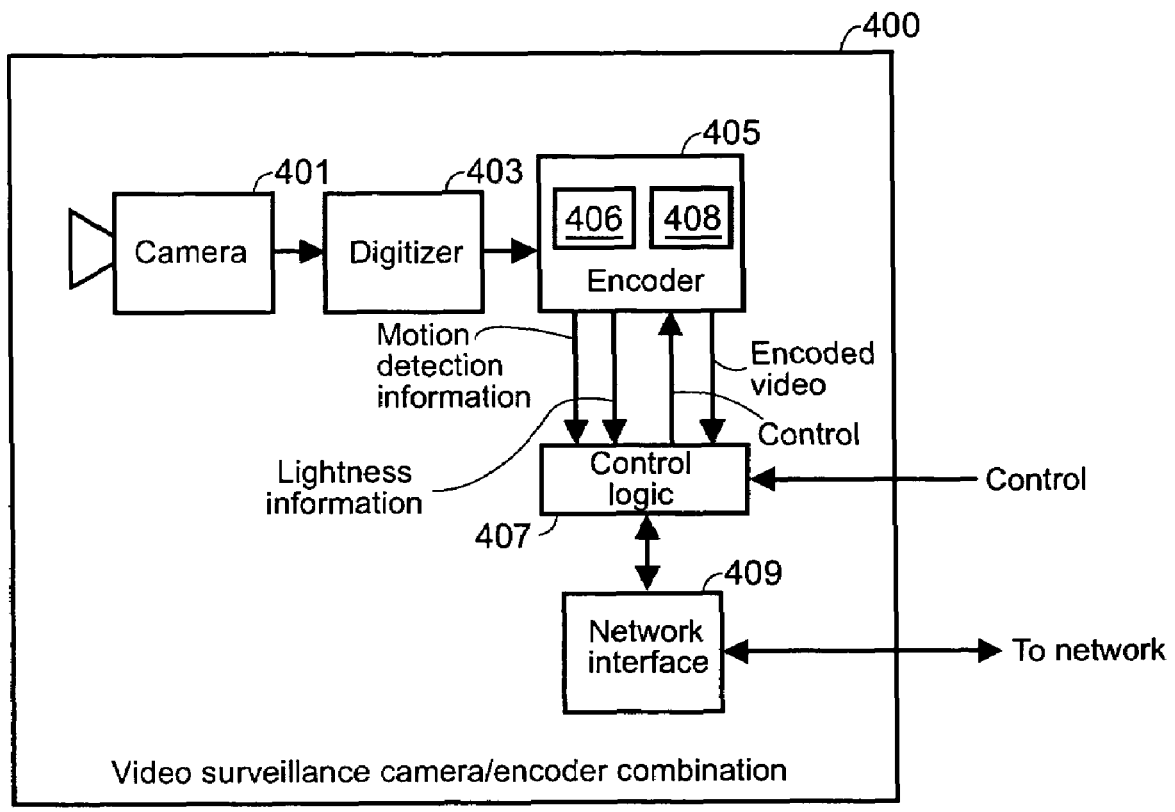
FIG. 4 shows a simplified block diagram of an embodiment of a surveillance camera/encoder combination that can be used in embodiments of the invention, and whose encoder's output bit rate is not settable from a central location, e.g., through a network connection.

FIG. 4 shows another alternate embodiment 400 of a video surveillance camera/encoder combination that does not provide for remote setting of the bit rate of the encoded video. With such a camera, the bit rate may be locally set at the location of the camera/encoder combination, e.g., according to one or more local criteria, such as motion detected at a local motion detector, the time of day, the time of the week, the time of the year, the amount of light in the frame, or a combination of at least two of these local criteria. One embodiment of the video surveillance camera/encoder combination 400 includes a camera 401—that could be the same as the camera 201—coupled to a digitizer 403—that could be the same as the digitizer 203. The digitizer is coupled to an encoder 405 that encodes the video to a constant bit rate stream according to a control input. The encoded video is accepted by a control logic subsystem 407 that forms data for packets for transmission via a network interface 409 coupled to a packet network. The control logic subsystem is configured to accept external but locally set control information to set the video bit rate. In one embodiment, the control logic is further configured to set the bit rate from the encoder according to at least one local criterion. Depending on the embodiment, the local criteria includes at least one of: time of day, lightness, and motion, e.g., activity in a scene. One embodiment of the encoder 405 includes a motion detector 406 that provides a measure of the overall activity in the scene. Another embodiment of the encoder 405 includes a lightness detector 408 that determines the lightness in the encoded video, e.g., as a measure proportional to the sum of the DC coefficients in the case that the encoder is a transform-based encoder. Such a measure of lightness may be provided in one embodiment as a separate signal for the control logic subsystem 407, as shown in FIG. 4, or, in another embodiment, the control logic subsystem 407 is configured to determine the measure of lightness from the encoded video itself. In one embodiment the control logic subsystem 407 includes a local clock and calendar such that one of the criterion by which to determine the constant bit rate can be the time of day, day of the week, and time of the year. In one embodiment, the control logic subsystem 407 is programmable to set the constant bit rate according to at least one of the set of criteria that consists of the overall activity, the time of day, the day of the week, the month of the year, and the measure of lightness.

The encoded video, including an indication of the frame rate and resolution, is sent via a network interface 409 to a central location.

Figure 5:
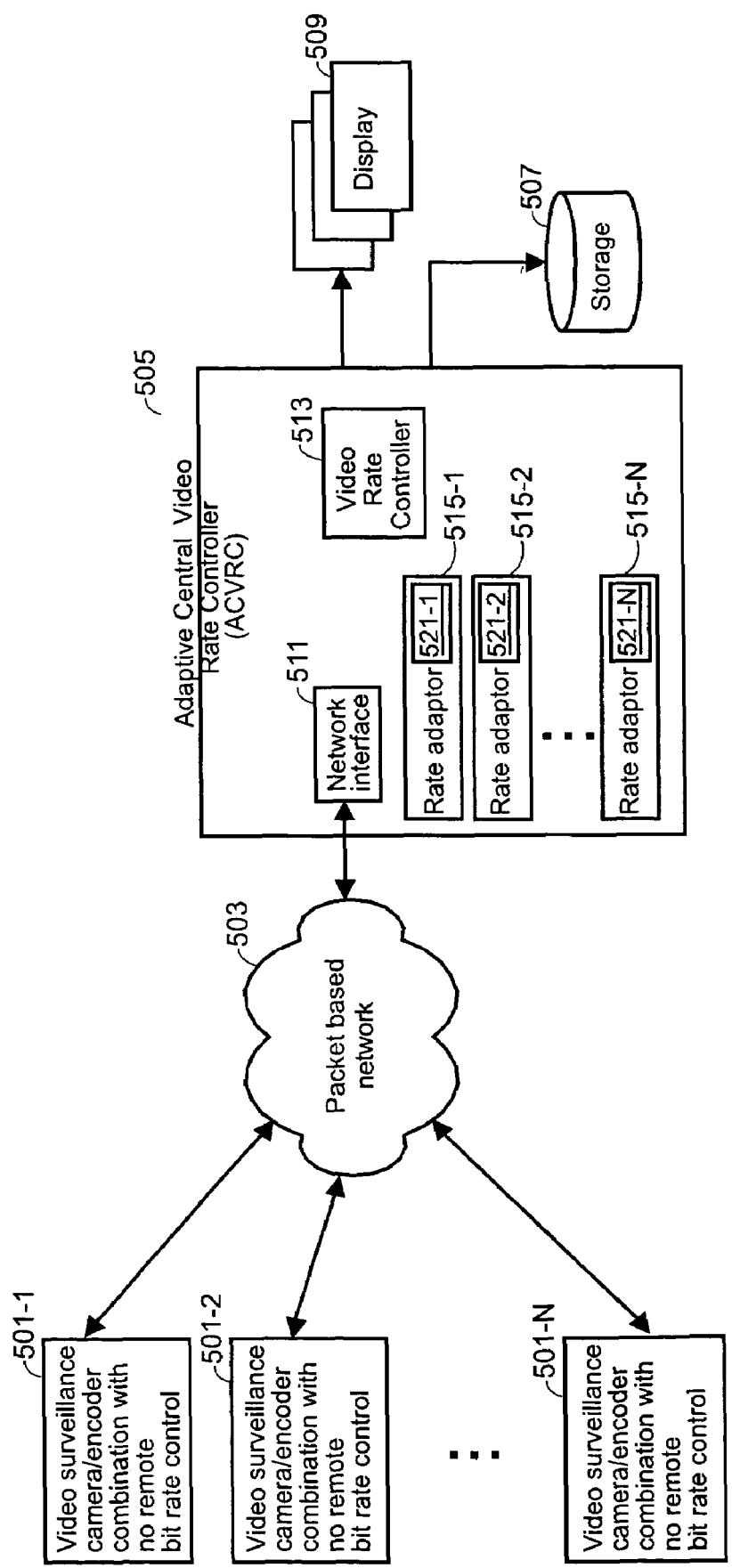
FIG. 5 shows an alternate architecture for working with a plurality of camera/encoder combinations, e.g., camera/encoder combinations such as shown in FIG. 4 whose respective bit rates are not remotely settable from a central location.

FIG. 5 shows an alternate architecture for working with a plurality of camera/encoder combinations such as shown in FIG. 4, e.g., camera/encoder combinations whose respective bit rates are not remotely settable from a central location. A plurality, say a number denoted N, of surveillance video camera/encoder combinations 501-1, 501-2, . . . , 501-N is included, each placed at its respective location. Each surveillance camera/encoder combination's encoder encodes the video from the camera to provide a compressed stream at a constant bit rate that is preset, either by an operator, or according to at least one local criterion. The camera/encoder combinations are connected to an adaptive central video rate controller (ACVRC) 505 via at least one receiver at the ACVRC 505. In one embodiment shown in FIG. 5, the connection is a network connection via a network 503, e.g., a LAN. In such an embodiment, the ACVRC's receivers include a network interface 511. The ACVRC 505 further includes a plurality of rate adaptors 515-1, 515-2, ..., 515-N, one corresponding to each incoming video streams. The streams also are accepted by a video rate controller 513 that controls each of the rate adaptors 515-1, 515-2, ..., 515-N. In an alternate embodiment, the connections between at least some of the camera/encoder combinations and the ACVRC are direct connections, and the SCVRC includes at least one receiver for such direct connection.

In one embodiment, each rate adaptor 515-1, 515-2, ..., 515-N is configured to extract a respective measure of the activity level in each of the video streams from each camera/encoder combination's encoded stream. These measures of the activity are provided to and accepted by the video rate controller 513. In another embodiment, each encoder in each camera/encoder combination extracts the respective measure of the activity level for the camera, and transmits the activity level to the ACVRC 505 that passes such measures to the video rate controller 513, such that the video rate controller 513 receives a respective measure of the activity level in each of the video streams from each camera/encoder combination. The video rate controller, e.g., video rate controller 513 in the ACVRC 505 is further configured to determine the respective bit-rates for each stream from each camera/encoder combination according to the respective extracted activity measure. Each rate adapter 515-1, 515-2, ..., 515-N includes a corresponding transcoder 521-1, 521-2, ..., 521-N, respectively, that transcodes its respective compressed input video stream from its respective preset bit rate to a bit rate determined by the video rate controller 513.

A storage medium 507 to store the collected video streams, and a display subsystem 509 to display the plurality or a selected one or more of the plurality of video streams are coupled to the ACVRC 505.

Figure 6A:
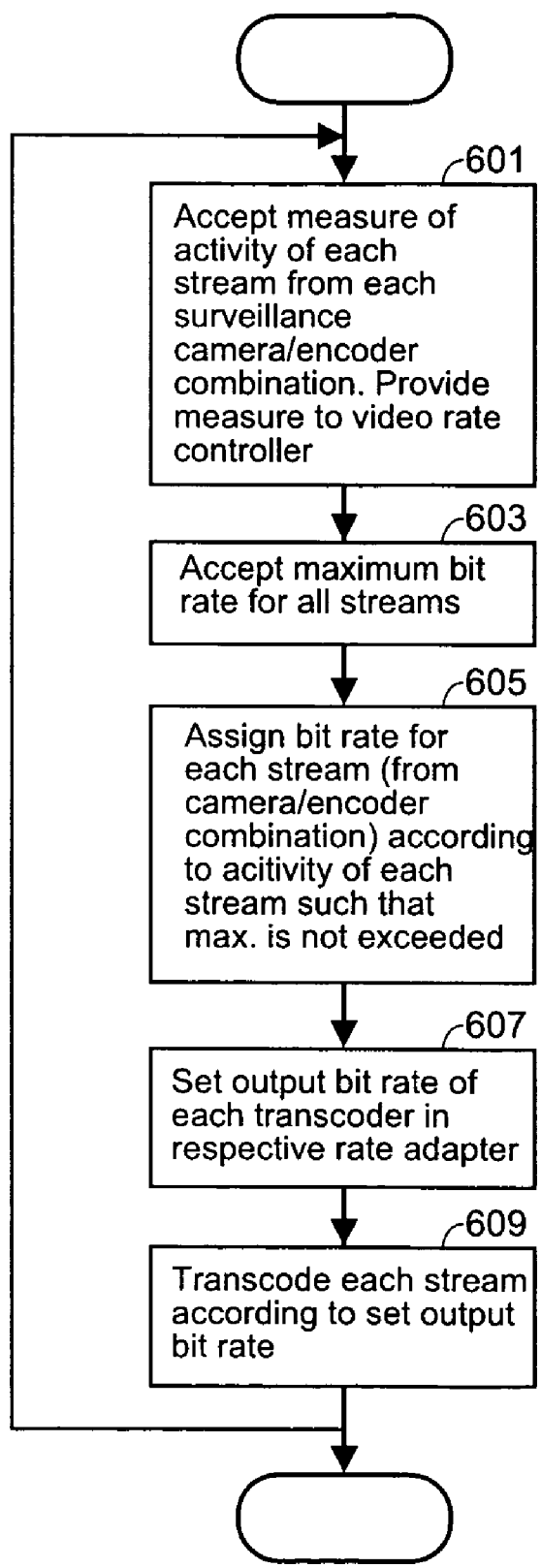
FIG. 6A shows a flowchart of one embodiment applicable to an architecture such as shown in FIG. 5 for the case that each camera/encoder combination sends video information and further determines and sends separate activity level signals for each frame.

Thus, for a configuration in which each surveillance camera/encoder combination includes an encoder and provides a measure of the activity in each video frame, but whose video compressor's output bit-rate cannot be controlled by an external device such as CVRC. FIG. 6A shows a flowchart of one embodiment applicable to an architecture such as shown in FIG. 5 for the case that each camera/encoder combination sends video information and further determines and sends separate activity level signals for each frame. This flowchart is applicable, for example, for use with a surveillance camera/encoder combination such as shown in FIG. 4.

Referring to FIG. 6A, in 601, the respective rate adapter of ACVRC 505 accepts the encoded compressed stream from the respective camera/encoder combination and also the overall level of activity in the respective compressed stream from the camera/encoder combination. The rate adapters provide this measure to the video rate controller 513. In an alternate embodiment, the respective measures are provided directly to the video rate controller 513 via the network interface 511.

In one embodiment, the overall maximum total bit rate available for all information is provided to the video rate controller, e.g., according to a pre-defined or operator defined bandwidth. Such overall bandwidth may be set, for example, by the capacity of recording apparatus such as storage 507 coupled to the ACVRC 505, or the capacity of the network in the case the output is further transported by the network.

Thus, a maximum total bit rate for all video streams is provided and in 603 accepted by the video rate controller 513. In 605, the video rate controller 513 determines the bit rates for each stream for each surveillance camera/encoder combination under the ACVRC's control according to the total available bandwidth. The bit rate for each respective surveillance camera/encoder combination's stream is set according to the activity level of the encoded video from the camera/encoder, such that the maximum bandwidth is not exceeded. In one embodiment, the bit rate for each camera/encoder combination is proportional to the determined activity level with the constraint of a minimum bit rate for each camera needed for overhead information and a maximum level equal to the maximum capability of the camera/encoder combination or a pre-set maximum.

The determined bit rate is used in 607 to set the transcoders 521-1, ..., 521-N of the rate adapters 515-1, ..., 515-N, respectively. In 609, the rate adapters transcode each video stream from each camera/encoder combination. The process continues with the accepting of video information the next time the activity level changes, or at a pre-set rate.

Figure 6B:
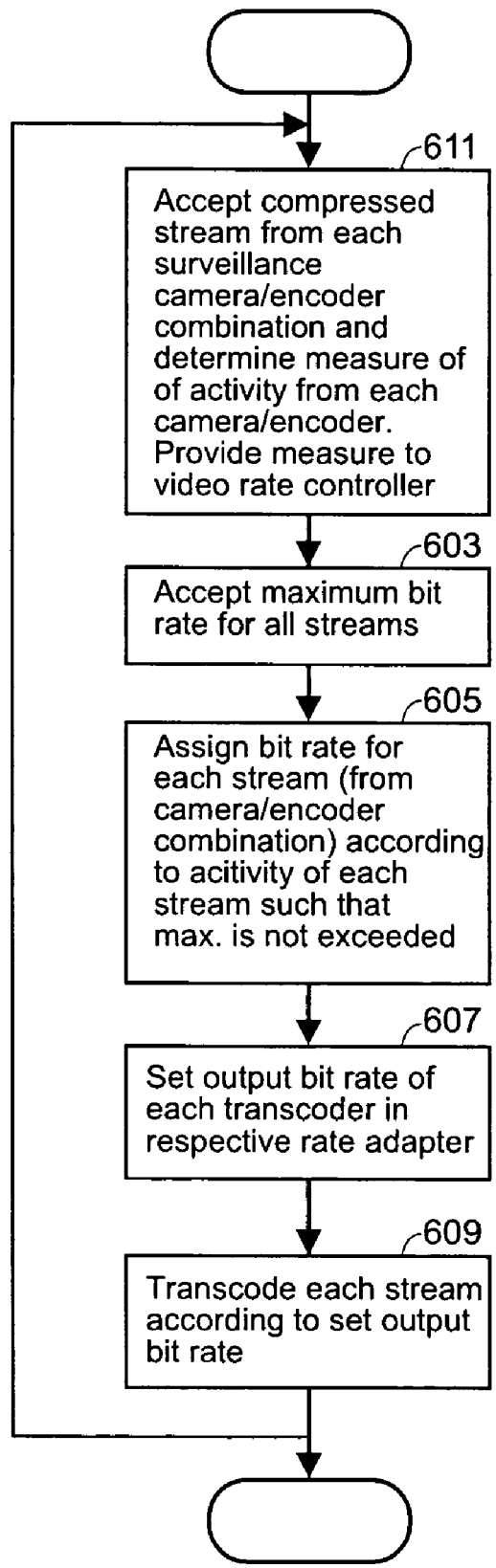
FIG. 6B shows a flowchart of another embodiment applicable to an architecture such as shown in FIG. 5 for the case that each camera/encoder combination sends encoded video information, and wherein any determination of the activity level signal for each frame is carried out remotely from the compressing of the video stream itself.

FIG. 6B shows a flowchart of another embodiment applicable to an architecture such as shown in FIG. 5 for the case that each camera/encoder combination sends encoded video information, and wherein any determination of the activity level signal for each frame is carried out remotely from the compressing of the video stream itself. Furthermore, the encoder's output bit rate is not remotely settable from a central controller of a plurality of camera/encoders.

Referring to FIG. 6B, in 61 1, the respective rate adaptors 515-1, ..., 515-N of the ACVRC 505 accept the encoded compressed streams from their respective camera/encoder combination, and partially decode the stream to determine for each video frame captured by the surveillance video camera a measure of the overall level of activity. Alternate methods of determining the overall measure of activity in the video include: measuring the frame-to-frame RMS difference; or measuring the sum of the motion vectors in the case that motion estimation or motion detection is included; or measuring the frame-to-frame change in background in a foreground/background method such as MPEG-4. In 611, the determined level of activity is provided to the video rate controller 513.

In one embodiment, the overall maximum total bit rate available for all information is provided to the video rate controller, e.g., according to a pre-defined or operator defined bandwidth. Such overall bandwidth may be set, for example, by the capacity of recording apparatus such as storage 507 coupled to the ACVRC 505, or the capacity of the network.

As in FIG. 6A, a maximum total bit rate for all video streams is provided to the video rate controller 513 and in 603 accepted by the controller 513. In 605, the video rate controller 513 determines the bit rates for each surveillance camera/encoder combination's stream under the ACVRC's control according to the total available bandwidth. The bit rate for each respective surveillance camera/encoder combination's stream is set according to the activity level of the encoded video from the camera/encoder, such that the maximum bandwidth is not exceeded. In one embodiment, the bit rate for each camera/encoder combination is proportional to the determined activity level with the constraint of a minimum bit rate for each camera needed for overhead information and a maximum level equal to the maximum capability of the camera/encoder combination or a pre-set maximum.

The determined output bit rate in 607 is provided to each rate adapter and used to set the transcoder so that the output bit rates from each rate adapter is correctly set. The transcoding of each stream occurs in 609.

Not shown in the flowcharts of FIGS. 6A or 6B are the decompression of the streams followed by displaying the streams. In alternate embodiments, the streams, e.g., in compressed form, are also archived for later review in a storage medium, e.g., a hard disk or VDV or other form. In alternate embodiments, the display may also be remote from the location of the CVRC, so that the video streams, again in compressed form, are sent to a remote location for display and further storage.

Figure 7:
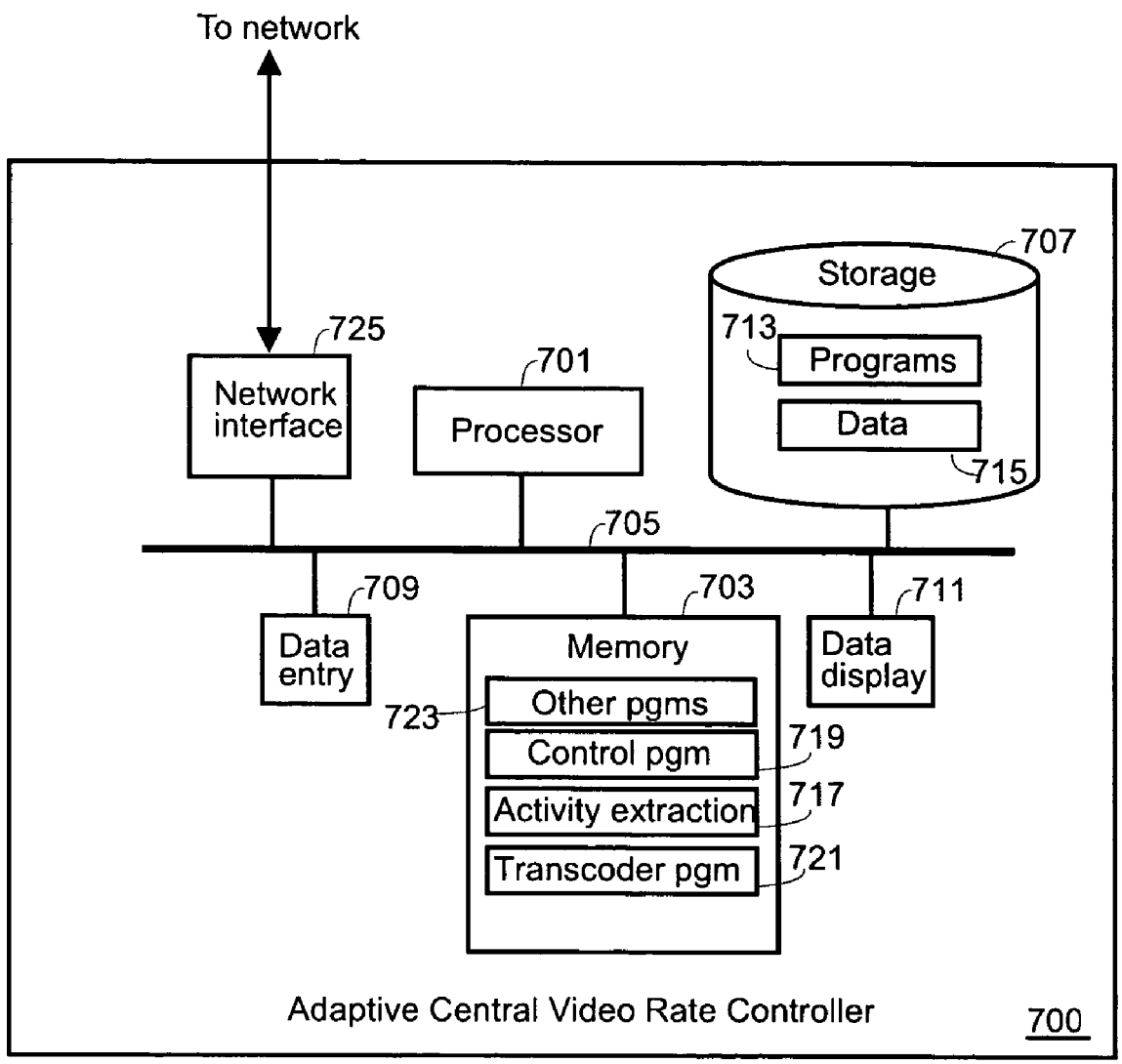
FIG. 7 shows in highly simplified block diagram form one embodiment of a central video rate controller that can be used as the adaptive central video rate controller shown in FIG. 5 and that includes a programmable processor.

FIG. 7 shows in highly simplified block diagram form one embodiment of a central video rate controller 700, in this case an adaptive central video rate controller that can be used as the ACVRC 505 shown in FIG. 5. The embodiment 700 shown in FIG. 7 may also be programmed to operate as a central video rate converter as shown as CVRC 105 in FIG. 1. The controller 700 a processing system, e.g., a computer that includes one or more processors. One such processor 701 is shown in FIG. 700. The processing system may be, for example, part of a network switch. The controller thus includes a memory connected to the processor via a bus subsystem 705, shown for simplicity in FIG. 7 as a single bus. A network interface 725 is also connected via the bus subsystem 705 to other components of the system. A data entry device 709, e.g., a keyboard is included and a data display 711 also is included for displaying information, e.g., status information. A mass storage subsystem 707 also is included coupled to the processor and memory via the bus subsystem 705. The storage system is configured to store programs 713 and data 715.

In the embodiment of the ACVRC 700 of FIG. 7, the rate adapters including the transcoders are implemented in software, e.g., as instructions that cause the at least one processor of the processing system to implement the required functions. In FIG. 7, the programs may all be stored in the storage subsystem 707 and loaded as necessary in the memory subsystem 703. FIG. 7 shows a program 717 to extract the overall measure of activity from a compressed stream, a control program 719 to accept measures extracted from each of the streams, and a program 721 to carry out transcoding according to the output but rates determined by the control program 719. FIG. 7 also shows other programs 723 in memory according to the other functions carried out by the apparatus 700.

A single processor is shown in FIG. 7 and those in the art will appreciate that this may represent several processors. Similarly, a single memory subsystem 703 is shown, and those in the art will appreciate that the memory subsystem may include different elements such as RAM, ROM, and so forth. In addition, the mass storage subsystem 707 is meant to include any non-volatile memory storage such as a magnetic or optical storage component. Note that at any time, some of the programs 717, 719, 721, and 723 may be in the different parts of the memory subsystem, as will be understood by those in the art. Each program includes instructions to instruct the processor to implement, in different versions, the different methods described above. Note that FIG. 7 does not show details such as the bus structures, I/O structures, and so forth that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

While the invention has been described above in terms of controlling surveillance camera/encoder combinations that produce constant bit rate output, the invention may easily be modified for systems that produce variable bit rates. Thus the invention, and the term "bit rate" is not to be meant to be restricted to camera/encoder combinations that produce a constant bit rate.

Furthermore, the invention can also be used in a network that includes at least one analog video surveillance camera that is attached to an encoder that is attached to a network interface, or that includes as a combination a network interface.

Similarly, while some embodiments have been described as devices such a central video rate controllers, the invention may also be implemented as a software program that can be used to upgrade existing controllers that receive data from digital cameras.

While the descriptions above have been for video streams from surveillance camera/encoder combinations, the outputs from the camera/encoder combinations may include audio and other information without deviating from the scope of the invention.

An example of camera/encoder combinations that may be used in various embodiments of the present invention include the VN-C30U visual network camera system and the VN-C10U visual network camera system, both made by Victor Company of Japan, Limited (JVC) of Yokahama, Japan. Other manufacturers also make camera/encoder combinations.

Thus, by globally and dynamically allocating the video compression bit-rate for a plurality of surveillance camera/encoder combinations, aspects of the present invention provide for improving the video quality of the surveillance video cameras on an as-needed basis, and reducing the storage needed for storing the captured video streams, and similarly reducing the network bandwidth required to deliver the captured video streams. Each camera/encoder combination is provided with the bit rate needed to capture the information recorded according to a measure of the activity in scenes.

Note that in the case motion detection is used, each camera/encoder combination may send information to the CVRC (or ACVRC) on the location in the video frames of areas of relatively high activities. Similarly, in the embodiments where the motion detection occurs centrally in the CVRC (or ACVRC), such areas of relatively high activity may be highlighted.

In an improved embodiment, the bit rate method used by the video rate controller in the CVRC (or ACVRC) can further be tuned with respect to one or more criteria including the time of the day, the day of the week, and time of the year, and so forth, in order to adjust the total bit rate allocation.

It would be clear to those skilled in the art that while FIGS. 1 and 4 each shows an architecture with a single central controller, the invention is applicable to having a plurality of controllers, each controlling arranged to control its own respective plurality of surveillance camera/encoder combinations, e.g., by setting the output bit rates, or by modifying the bit rate of already encoded outputs.

The methodologies described herein are, in one embodiment, performable by a machine, which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one typical machine may be exemplified by a typical processing system that includes one or more processors. Each processor may include one or more of a CPU, a graphics processing unit, and a programmable DSP unit. The processing system further may include a memory subsystem including main RAM and/ or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a Web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of central video rate controller, or an adaptive central video rate controller as appropriate. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer-readable storage medium) carrying computer-readable program code segments embodied in the medium.

The software may farther be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any computer-readable storage medium that is capable of storing, or encoding a set of instructions for execution by the machine and that cause the machine to perform any one or more of the methodologies of the present invention. A carrier medium may take many forms, including but not limited to, non-volatile media, and/or volatile media. Non-volatile media includes, for example, optical, magnetic disks, and/or magneto-optical disks. Volatile media includes dynamic memory, such as main memory. For example, the term "carrier medium" shall accordingly be taken to include, but not be limited to, solid-state memories, optical and/or magnetic media.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of some compression methods, and not others, the invention is not limited to such contexts and may be utilized in various other applications and systems, for example in a system that uses proprietary compression methods, or other compression methods not yet well known. Furthermore, the invention is not limited to any one type of network architecture and method of encapsulation, and thus may be utilized in conjunction with one or a combination of other network architectures/protocols.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating an apparatus configured to process one or more video streams, the method comprising:
receiving a plurality of encoded video streams, each stream received over a packet network from a respective surveillance camera/encoder combination of a plurality of camera/encoder combinations, each respective surveillance camera/encoder combination coupled to the packet network, at least some of the camera/encoder combinations being configured to accept a remotely generated bit rate control to set an output bit rate of the encoded stream from the camera/encoder combination;
receiving from each camera/encoder combination a measure of level of activity for each encoded video stream, wherein the encoder of each of the camera/encoder combinations determines and provides the measure, each measure obtained from the output of the camera of the corresponding camera/encoder combination;
assigning an output bit rate to the encoder of each of the camera/encoder combinations according to an accepted level of activity such that a total bit rate of all encoded streams does not exceed a maximum overall bit rate; and
sending control information over the packet network such that a respective bit rate control is provided to each of the camera/encoder combinations that accept a remotely generated bit rate control, wherein the respective bit rate control sets the output bit rate for each respective camera/encoder combination such that the total bit rate of all encoded streams does not exceed the maximum overall bit rate.

2. A method as recited in claim 1, wherein at least some of the camera/encoder combinations output their respective encoded video stream at a respective pre-set bit rate, the method further comprising:
transcoding the encoded video streams from the at least some of the camera/encoder combinations from the respective pre-set bit rate to assigned bit rates.

3. A method as recited in claim 2, wherein the pre-set bit-rate of at least one of the encoded streams from at least one of the camera/encoder combinations is locally set at the location of the camera/encoder combination according to at least one local criterion of a set of local criteria consisting of motion detected at a local motion detector, the local time of day, time of the week, time of the year, and the amount of light in the video of the encoded camera/encoder combination output.

4. A method as recited in claim 1, wherein the measure of the level of activity for each stream is determined at the corresponding camera/encoder combination, the method further comprising:
receiving the measures of the level of activity for each stream from the respective surveillance camera/encoder combinations.

5. A method as recited in claim 4, further comprising:
receiving at least one local measure from at least one of the camera/encoder combinations, the local measure being at least one of a set of local measures consisting of: the local time of day, time of the week, time of the year, and the amount of light in the video of the encoded camera/encoder combination output, wherein the assigning of the bit rate for any camera/encoder combination for which at least one of the local measures is received uses one or more of the received local measures.

6. A method as recited in claim 4, wherein the receiving of the measures of the level of activity for at least some of the streams is over the packet network.

7. A method as recited in claim 1, further comprising:
determining the measure of the level of activity for each encoded video stream from the stream received from the corresponding camera/encoder combination.

8. A method as recited in claim 1, wherein the received streams or transcoded versions thereof are stored in a storage device.

9. A method as recited in claim 1, wherein the accepting of a measure of the level of activity for each encoded video stream further includes receiving information on the location in the video of the encoded camera/encoder combination output of any area of relatively high activity.

10. A computer-readable storage medium encoded with executable instructions that when executed by one or more processors of a processing system coupled to a packet network cause carrying out of a method comprising:
receiving a plurality of encoded video streams, each stream received over the packet network from a respective surveillance camera/encoder combination of a plurality of camera/encoder combinations, each respective surveillance camera/encoder combination coupled to the packet network, at least some of the camera/encoder combinations being configured to accept a remotely generated bit rate control to set an output bit rate of the encoded stream from the camera/encoder combination;
receiving from each camera/encoder combination a measure of level of activity for each encoded video stream, wherein the encoder of each of the camera/encoder combinations determines and provides the measure, each measure obtained from the output of the camera of the corresponding camera/encoder combination;
assigning an output bit rate to the encoder of each of the camera/encoder combinations according to an accepted level of activity such that a total bit rate of all encoded streams does not exceed a maximum overall bit rate; and
sending control information over the packet network such that a respective bit rate control is provided to each of the camera/encoder combinations that accept a remotely generated bit rate control, wherein the respective bit rate control sets the output bit rate for each respective camera/encoder combination such that the total bit rate of all encoded streams does not exceed the maximum overall bit rate.

11. A computer-readable storage medium as recited in claim 10, wherein at least some of the camera/encoder combinations output their respective encoded video stream at a respective pre-set bit rate, and wherein the method further comprises:
transcoding the encoded video streams from the at least some of the camera/encoder combinations from the respective pre-set bit rate to assigned bit rates.

12. A computer-readable storage medium as recited in claim 11, wherein the pre-set bit-rate of at least one of the encoded streams from at least one of the camera/encoder combinations is locally set at the location of the camera/encoder combination according to at least one local criterion of a set of local criteria consisting of: motion detected at a local motion detector, the local time of day, time of the week, time of the year, and the amount of light in the video of the encoded camera/encoder combination output.

13. A computer-readable storage medium as recited in claim 10, wherein the measure of the level of activity for each stream is determined at the corresponding camera/encoder combination, and wherein the method further comprises:
  receiving the measures of the level of activity for each stream from the respective surveillance camera/encoder combinations.

14. A computer-readable storage medium as recited in claim 13, wherein the method further comprises:
  receiving at least one local measure from at least one of the camera/encoder combinations, the local measure being at least one of a set of local measures consisting of: the local time of day, time of the week, time of the year, and the amount of light in the video of the encoded camera/encoder combination output,
and wherein the assigning of the bit rate for any camera/encoder combination for which at least one of the local measures is received uses one or more of the received local measures.

15. A computer-readable storage medium as recited in claim 13, wherein the receiving of the measures of the level of activity for at least some of the streams is over a packet network.

16. A computer-readable storage medium as recited in claim 10, wherein the method further comprises:
  determining the measure of the level of activity for each encoded video stream from the stream received from the corresponding camera/encoder combination.

17. A computer-readable storage medium as recited in claim 10, wherein the received streams or transcoded versions thereof are stored in a storage device.

18. A computer-readable storage medium as recited in claim 10, wherein the accepting of a measure of the level of activity for each encoded video stream further includes receiving information on the location in the video of any area of relatively high activity.

19. An apparatus comprising:
  means for receiving a plurality of encoded video streams, each stream received from a respective surveillance camera/encoder combination of a plurality of camera/encoder combinations, each respective surveillance camera/encoder combination coupled to a packet network, at least some of the camera/encoder combinations including means for accepting a remotely generated bit rate control to set an output bit rate of the encoded stream from the camera/encoder combination;
  means for receiving from each camera/encoder combination a measure of level of activity for each encoded stream, wherein the encoder of each of the camera/encoder combinations determines and provides the measure, each measure obtained from the output of the camera of the corresponding camera/encoder combination;
  means for assigning an output bit rate to the encoder of each of the camera/encoder combinations according to an accepted level of activity such that a total bit rate of all encoded streams does not exceed a maximum overall bit rate; and
  means for sending control information over the packet network such that a respective bit rate control is provided to each of the camera/encoder combinations that accept a remotely generated bit rate control, wherein the respective bit rate control sets the output bit rate for each respective camera/encoder combination such that the total bit rate of all encoded streams does not exceed the maximum overall bit rate.

20. An apparatus as recited in claim 19, wherein at least some of the camera/encoder combinations output their respective encoded video stream at a respective pre-set bit rate, the apparatus further comprising:
  means for transcoding the encoded video streams from the at least some of the camera/encoder combinations from the respective pre-set bit rate to assigned bit rates.

21. An apparatus as recited in claim 20, wherein the pre-set bit-rate of at least one of the encoded streams from at least one of the camera/encoder combinations is locally set at the location of the camera/encoder combination according to at least one local criterion of a set of local criteria consisting of: motion detected at a local motion detector, the local time of day, time of the week, time of the year, and the amount of light in the video of the encoded camera/encoder combination output.

22. An apparatus as recited in claim 19, wherein the measure of the level of activity for each stream is determined at the corresponding camera/encoder combination, the apparatus further comprising:
  means for receiving the measures of the level of activity for each stream from the respective surveillance camera/encoder combinations.

23. An apparatus as recited in claim 22, further comprising:
  means for receiving at least one local measure from at least one of the camera/encoder combinations, the local measure being at least one of a set of local measures consisting of: the local time of day, time of the week, time of the year, and the amount of light in the video of the encoded camera/encoder combination output,
wherein the means for assigning of the bit rate for any camera/encoder combination for which at least one of the local measures is received uses one or more of the received local measures.

24. An apparatus as recited in claim 22, wherein the means for receiving of the measures of the level of activity for at least some of the streams is for receiving over a packet network.

25. An apparatus as recited in claim 19, further comprising:
  means for determining the measure of the level of activity for each encoded video stream from the stream received from the corresponding camera/encoder combination.

26. An apparatus as recited in claim 19, further comprising means for storage such that the received streams or transcoded versions thereof are stored in the means for storage.

27. An apparatus as recited in claim 19, wherein the means for accepting a measure of the level of activity for each encoded video stream further includes means for receiving information on the location in the video of any area of relatively high activity.

28. An apparatus comprising:
  at least one receiver coupled to a packet network and configured to receive a plurality of encoded video streams over the packet network, each stream being from a respective surveillance camera/encoder combination of a plurality of camera/encoder combinations, each respective surveillance camera/encoder combination coupled to the packet network, at least some of the camera/encoder combinations being configured to accept a remotely generated bit rate control to set an output bit rate of the encoded stream from the camera/encoder combination;
  a video rate controller coupled to the at least one receiver and configured to receive from each camera/encoder combination a measure of level of activity for each encoded video stream, wherein the encoder of each of the camera/encoder combinations determines and provides the measure, each measure obtained from the output of the camera of the corresponding camera/encoder combination, the video rate controller further configured to assign an output bit rate to the encoder of each of the camera/encoder combinations according to an accepted level of activity such that a total bit rate of all encoded streams does not exceed a maximum overall bit rate; and at least one transmitter coupled to the video rate controller configured to send control information over the packet network such that assigned bit rates are provided as respective bit rate controls to each of the camera/encoder combinations that accept a remotely generated bit rate control, wherein the respective bit rate control sets the output bit rate for each respective camera/encoder combination such that the total bit rate of all encoded streams does not exceed the maximum overall bit rate.

29. An apparatus as recited in claim 28, wherein at least some of the camera/encoder combinations are configured to output their respective encoded video stream at a respective pre-set bit rate, the apparatus further comprising:

at least one transcoder coupled to the at least one receiver and to the video rate controller, the at least one transcoder arranged to accept the encoded video streams from the at least some of the camera/encoder combinations, to accept the respective assigned bit rates, and to transcode from the respective pre-set bit rate to the respective assigned bit rates.

30. An apparatus as recited in claim 29, wherein the pre-set bit-rate of at least one of the encoded streams from at least one of the camera/encoder combinations is locally set at the location of the camera/encoder combination according to at least one local criterion of a set of local criteria consisting of motion detected at a local motion detector, the local time of day, time of the week, time of the year, and the amount of light in the video from the camera/encoder combination.

31. An apparatus as recited in claim 28, wherein the measure of the level of activity for each stream is determined at the corresponding camera/encoder combination, and wherein the receivers are further configured to receive the measures of the level of activity for each stream from the respective surveillance camera/encoder combinations.

32. An apparatus as recited in claim 31,
wherein the receivers are further configured to receive at least one local measure from at least one of the camera/encoder combinations, the local measure being at least one of a set of local measures consisting of: the local time of day, time of the week, time of the year, and the amount of light in the video from the camera/encoder combination, and wherein the video rate controller is arranged to set the bit rate for any camera/encoder combination for which at least one of the local measures is received using one or more of the received local measures.

33. An apparatus as recited in claim 28, further comprising:

a motion detector configured to determine the measure of the level of activity for each encoded video stream from the stream received from the corresponding camera/encoder combination.

34. An apparatus as recited in claim 28, wherein the at least one receiver includes a network interface configured to receive at least some of the encoded streams over a packet network.

35. An apparatus as recited in claim 28, further comprising a storage subsystem such that the received streams or transcoded versions thereof are stored in the means for storage.

36. An apparatus as recited in claim 28, wherein the video rate controller is further configured to accept for at least some of the received encoded video streams information on the location in the video frame of any area of relatively high activity.

\* \* \* \* \*

UNITED STATES PATENT AND TRADEMARK OFFICE
CERTIFICATE OF CORRECTION

| | |
|---|---|
| PATENT NO. | : 7,649,938 B2 |
| APPLICATION NO. | : 10/970129 |
| DATED | : January 19, 2010 |
| INVENTOR(S) | : Chen et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1464 days.

Signed and Sealed this

Twenty-eighth Day of December, 2010

David J. Kappos
*Director of the United States Patent and Trademark Office*